(12) United States Patent
Wayne

(10) Patent No.: US 6,753,912 B1
(45) Date of Patent: Jun. 22, 2004

(54) SELF COMPENSATING CORRELATED DOUBLE SAMPLING CIRCUIT

(75) Inventor: David A. Wayne, Scottsdale, AZ (US)

(73) Assignee: Taiwan Advanced Sensors Corporation, Taipei Hsien (TW)

( * ) Notice: Subject to any disclaimer, the term of this patent is extended or adjusted under 35 U.S.C. 154(b) by 0 days.

(21) Appl. No.: 09/387,548

(22) Filed: Aug. 31, 1999

(51) Int. Cl.[7] .......................... H04N 5/217; H04N 3/14; H04N 5/335; H04N 5/228

(52) U.S. Cl. ...................... 348/241; 348/308; 348/301; 348/208.1; 250/332; 250/331

(58) Field of Search ................................ 348/241, 308, 348/301, 208.1; 250/332, 351

(56) References Cited

U.S. PATENT DOCUMENTS

| | | | | |
|---|---|---|---|---|
| 5,777,329 A | * | 7/1998 | Westphal et al. | 250/339.02 |
| 5,917,547 A | * | 6/1999 | Merrill et al. | 348/301 |
| 6,025,875 A | * | 2/2000 | Vu et al. | 348/241 |
| 6,091,449 A | * | 7/2000 | Matsunaga et al. | 348/308 |
| 6,201,572 B1 | * | 3/2001 | Chou | 348/241 |
| 6,362,482 B1 | * | 3/2002 | Stettner et al. | 250/370.08 |
| 6,392,232 B1 | * | 5/2002 | Gooch et al. | 250/332 |
| 6,535,247 B1 | * | 3/2003 | Kozlowski et al. | 348/241 |

* cited by examiner

Primary Examiner—Wendy R. Garber
Assistant Examiner—James M Hannett
(74) Attorney, Agent, or Firm—Baker Botts LLP

(57) ABSTRACT

A self-compensating correlated double sampling circuit for a pixel image signal and a method to process the same. In the circuit, the analog signal generated by the photosensor of the pixel array accessed by a row selection transistor is buffered through a source follower amplifier and coupled to a column in the array. The analog signal from the selected column line is fed through a CDS circuit which is then input to the sample and hold circuit of the ADC. The main purpose of the CDS circuit is to reduce the noise and non-uniformity caused by the non ideal effects associated with the signal path from the photosensor through the CDS circuit. This is accomplished by sampling the signal and a reference level and then performing the subtraction on the two samples and the ADC ramp through the same signal path.

6 Claims, 3 Drawing Sheets

SELF COMPENSATING CORRELATED DOUBLE SAMPLING CIRCUIT

BACKGROUND OF THE INVENTION

1. Field of the Invention

The present invention relates to an image sensor and more particularly, to the circuitry of a self-compensating correlated double sampling circuit.

2. Description of the Prior Art

An image sensor is used to transform an optical image signal focused on the sensor into an electrical signal. The image sensor typically consists of an array of light receiving elements where each element produces a signal in response to the light intensity impinging on that element when an image is focused on the array. These signals may then be used to display a corresponding image on a display apparatus, such as a CRT monitor or a LCD display.

Of very well known types of image sensor, one is a charge-coupled device (CCD). Integrated circuit chips containing a CCD image sensor are expensive due to the special manufacturing processes required. Charge Coupled Devices also consumes relatively large power dissipation because of the required clock signals which usually must operate with high voltage.

In contrast to CCD image sensors, CMOS active pixel sensors (hereinafter called APS) have attracted much attention recently because they offer the possibility of monolithic integration of control, drive and signal process circuitry upon a single chip. In addition, they offer: (1) lower voltage operation and low power consumption, (2) process compatibility with on-chip electronics, and (3) potentially lower cost as compared to the conventional CCD because of the wide availability of standard CMOS manufacturing process.

However, it is known that for large area and high density pixel arrays, the analog signal generated by each light receiving element will suffer from varying degrees of parasitic effects, such as those caused by parasitic capacitance, resistance, dark current leakage, or non-uniformity of device characteristics. These parasitic effects are inherent in semiconductor devices and result in degradation of the signal to noise ratio of the image information. Therefore, noise issues pose major challenges which can limit performance of the CMOS APS. These noise sources includes (1) kT/C noise, which is associated with the sampling of the image data, (2) 1/f noise, which is associated with the circuit used to amplify the image signal, and (3) fixed pattern noise (FPN), which is associated with the non-uniformity of the signal processing electronics of the sensor. FPN relating to the columns of an image sensor is visually unpleasant because it is easily detected by the human eye, as it has the effect of vertical lines or strips in the image.

FIG. 1 shows the architecture of a conventional image sense amplifier circuit, as described in numerous publications. The column signal is connected to the pixel through a row transistor T1 (the access transistor) and thus is pulled up to a voltage related to the light that has fallen on the pixel. This column voltage level will differ from the actual pixel photosensor voltage (or be "offset" from it) by the gate-source voltage drop of the source follower transistor T2. The resulting voltage level is stored on the capacitor C1 by means of a momentary closure of the switch T4.

In the next phase, the reset transistor T5 in the pixel is turned on, pulling the pixel voltage level up to a reference level. The column voltage is also thereby pulled up to a voltage related to this reference level and offset from it by the gate-source voltage of the source follower transistor T2, as was the case in the first phase. This reference voltage is then stored on the second capacitor C2. Thus, the difference in the voltages stored on capacitors C1 and C2 can be seen to be the pixel photosensor signal. Since the offset voltage due to the source follower transistor as well as the low frequency noise appears as a voltage common to both capacitors, they may be approximately canceled by subtraction. The two signals are transferred to the following stage 8, a differential amplifier which provides for this subtraction through the buffer circuitry 7. However, because these buffer stages 7 have their own offset and noise, a similar reference and subtraction operation is needed, not shown here, which complicates the circuitry further, requiring additional switch transistors and voltage sources.

Moreover, because of the number of devices required to implement this circuitry, there are many sources of variation, which then may result in FPN. In addition, because of the method of cancellation of offset in the subsequent buffer stages, the time required to perform such cancellation will result in reducing the speed of operation.

The present invention is intended to minimize the effects caused by the aforementioned device variations, as well as providing simpler and more compact implementation and higher operating speed.

SUMMARY OF THE INVENTION

A signal processor which involves a self-compensating correlated double sampling (CDS) circuit and an ADC for obtaining the signal from a pixel of an image sensor is disclosed. The CDS circuit comprises a first capacitor, a buffer amplifier, and a reference-setting transistor. The first capacitor has a first plate, serving as an input terminal which is charged in response to the pixel photosensor, and the second plate of the first capacitor is connected to a ramp voltage signal when the reference-setting transistor is switched on. This second plate of the first capacitor is also connected to the input terminal of the buffer amplifier. Further, the reference-setting transistor is connected to the second plate of the first capacitor and a ramp voltage supply.

The ADC circuit comprises a second capacitor, a comparator, the buffer amplifier, and the reference-setting transistor. The second capacitor is connected between the buffer amplifier and the comparator, which has a switch transistor being connected between its input terminal and its output terminal. Further, the comparator operates to set a threshold voltage, which is stored on the second capacitor when the switch transistor is on. This operation is commonly referred to as auto-zeroing. Still further, the comparator provides an output signal to a digital counter when the switch transistor is off and the set-reference transistor is switched from off to on so as to receive an increasing ramp voltage.

In the preferred embodiment, the subtraction operation is accomplished immediately at the input to the CDS circuit, so that the subsequent circuitry is simplified. In addition, a simpler interface to the input of the ADC is desirable, again to reduce the complexity of the resulting circuitry, and to increase the speed of operation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

As depicted in the foregoing background of the invention, the issues occurring in the conventional CDS circuit include: two sets of sampling capacitors and switching transistors for sampling the light detected signal and the reset signal, and even more transistors for the differential amplifier and other cancellation circuitry. The output voltage of the differential amplifier must then be input to the analog-to-digital converter. As a result, when using the conventional CDS circuitry, many devices are needed. This is in conflict with the need for a very compact CDS and ADC combination in order to fit in the limited area available, determined by the pitch (or width of columns) of the pixel array.

Figure 1:
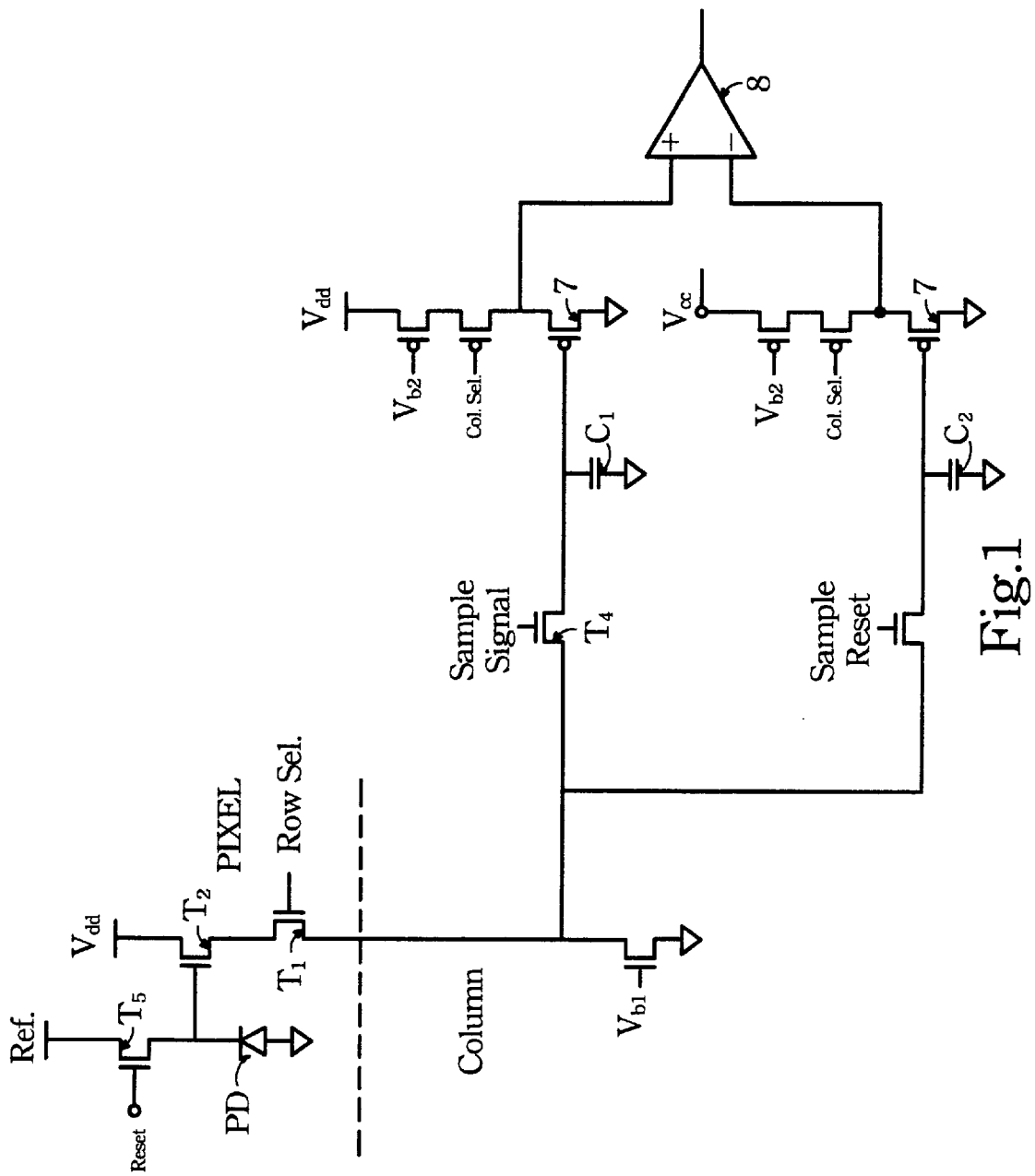
FIG. 1 is a pixel and column circuit of an image sensor using two sampling paths in a CDS circuit to eliminate the FPN noise in accordance with the prior art.
Figure 2:
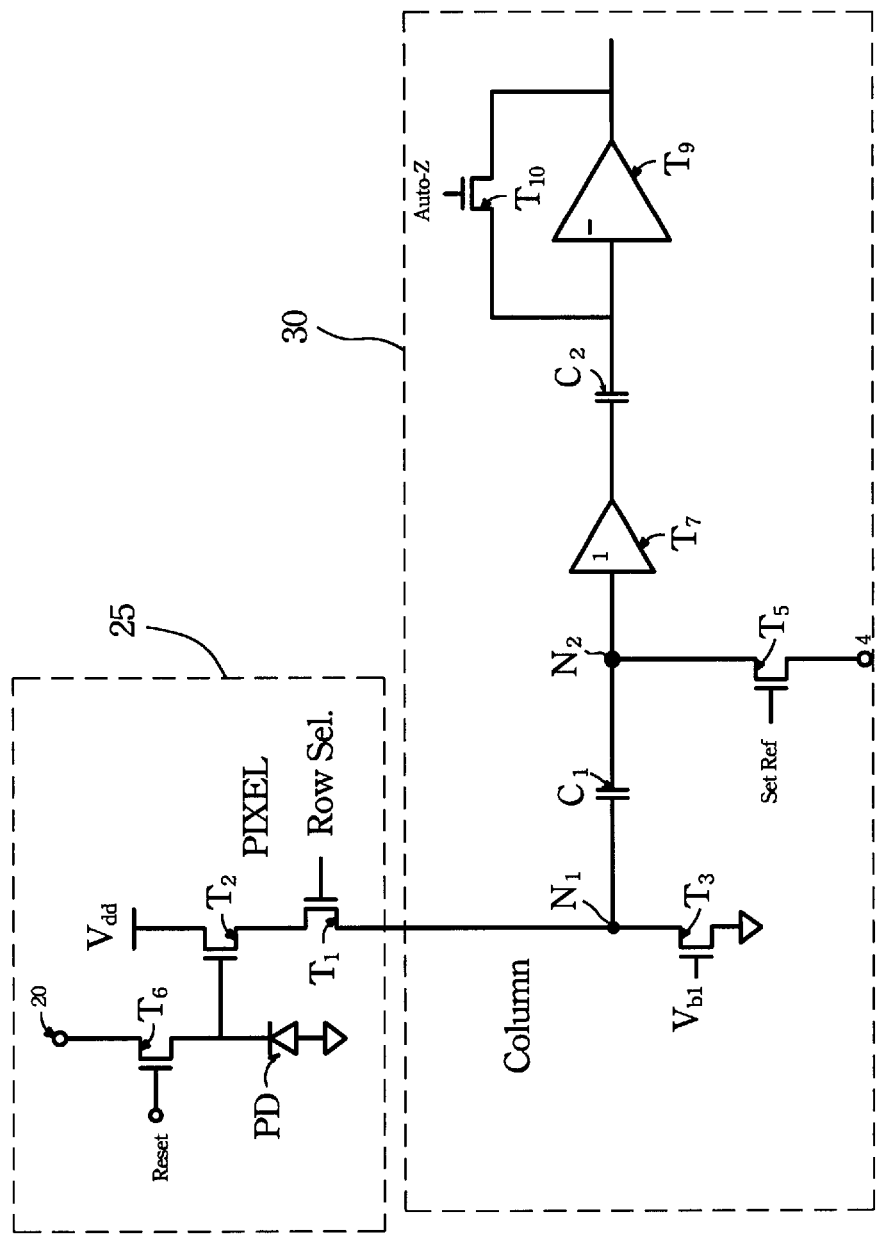
FIG. 2 is a pixel and column circuit of an image sensor using a single path to deal with signal sampling and reference level in a CDS circuit and ADC circuit according to the present invention.

The present invention's operation is accomplished by sampling the signal and pixel reference level as well as the ADC ramp voltage through the same path so as to eliminate the variation of the path as well as low-frequency noise. The detailed CDS circuitry and operation are depicted as follows:

FIG. 2 depicts the circuit architecture in accordance with a preferred embodiment of the present invention. Shown in FIG. 2 are a pixel circuit 25, which appears at each instance of a rectangular array having rows and columns. Also shown in FIG. 2 is a signal processing circuit 30, which is placed at each column of the array. The pixel circuit 25 contains a photosensor PD, a reset transistor T6, a source follower transistor T2, and a row selection transistor T1. In the pixel circuit, reset transistor T6 is connected between the photosensor PD and a reference voltage 20, so that when transistor T6 is turned on, the photosensor PD voltage is reset to a high level. When light impinges on the photosensor, the voltage will drop according to the amount of light received. The photosensor PD is also connected to the gate terminal of the source follower transistor T2. This same transistor T2 has its drain terminal connected to the positive power supply Vdd, and its source terminal is connected to the drain terminal of the row selection transistor T1. The source terminal of transistor T1 is connected to the column line N1, which is in turn connected to the input of the signal processing circuit 30. The gate terminal of the row selection transistor T1 is connected to the gate terminal of similar transistors T1 in other pixel circuits in the same row, and these are driven by a common signal, allowing all pixels in a given row to be connected to their appropriate column lines at the same time.

The signal processor 30 includes a pull-down current source transistor T3, a correlated double sampling (CDS) circuit and an analog-to-digital converter (ADC) circuit. The CDS circuit uses a first capacitor C1, a buffer amplifier T7, and a reference-setting transistor T5. The ADC circuit uses a capacitor C2, a comparator T9, which has a switch transistor T10 connecting between the input terminal and the output terminal of the comparator, as well as the reference-setting transistor T5 and the buffer amplifier T7.

The first capacitor C1 has a plate serving as an input terminal N1 connected to the column line and the other plate connected to an input terminal of the buffer amplifier T7. The reference-setting transistor T5 is connected between a node N2 and a ramp voltage terminal 4. Further, The node N2 is a node between the first capacitor C1 and the buffer amplifier T7.

In the ADC circuit, the second capacitor C2 is connected between the output terminal of the buffer amplifier T7 and the input terminal of the comparator T9. The output of the comparator T9 drives the digital counter (not shown) to count the digital value of the pixel image signal. It is noted that the reference-setting transistor T5 and buffer amplifier T7, which are used in the CDS, are both used in the ADC again.

Figure 3:
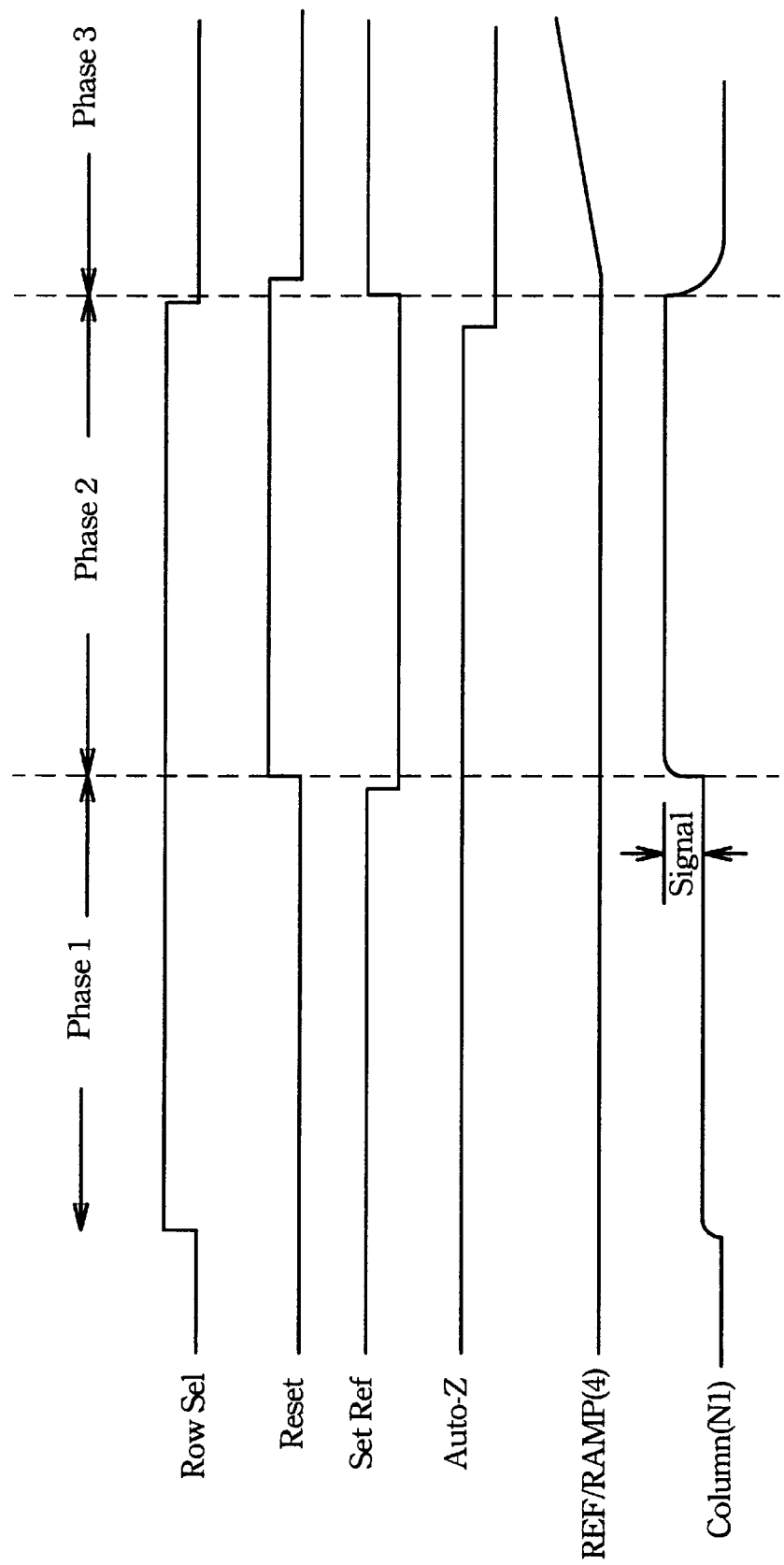
FIG. 3 is a timing chart illustrating the controlling signal operation according to the circuitry shown in FIG. 2.

Refer still to FIG. 2 and also to FIG. 3, in which a corresponding waveform is shown. The pixel is the same as the conventional CDS case. As before, the pixel photosensor PD has been exposed to the light, and hence the voltage thereof is at a level corresponding to the light that had impinged on the pixel. In the first phase, denoted as Phase 1 in FIG. 3, the pixel is connected to the column line by means of the access transistor T1, and the column voltage rises, as before, to a level corresponding to the pixel level, but offset from it by the gate-source voltage of the source follower transistor T2. The column voltage is stored on the capacitor C1, since its opposite terminal is connected to the ramp voltage 4 through the reference-setting transistor T5. At this time the ramp voltage is held at a stable reference level by circuitry not shown.

In the next phase, shown as Phase 2 in FIG. 3, transistor T5 is turned off, and the reset transistor T6 in the pixel is turned on. The column voltage (at node N1) is therefore pulled up to a voltage offset from the reference level by the gate-source voltage of the source follower transistor T2. The voltage on the opposite plate of the capacitor C1, thereby, rises to about the pixel voltage. In other words, the needed subtraction has been accomplished by the action of the voltage charged on the capacitor C1.

The resulting signal is then sent to the buffer amplifier T7 whose output is used as the input to the sample-and-hold of the column analog to digital converter (ADC).

The ADC used here is of a type known as a "serial" analog-to-digital converter since the value of the input is serially compared with an increasing digital value. In one implementation of a serial ADC, the input is compared to a voltage which is increased from the minimum value of the input to the maximum value, as a ramp voltage, during which a counter is incremented from the minimum digital value toward its maximum. When the increasing ramp voltage equals the input voltage, the counter is stopped and then contains the digital equivalent of the input voltage. The implementation of this type of serial ADC is described in the following.

Capacitor C2 is connected to the output of buffer amplifier T7, and its opposite side goes to the comparator T9. During the second phase, the comparator's output and input are connected together by switch transistor T10; thus, the comparator's input voltage at its switching threshold is the voltage level that is connected to capacitor C2. This phase also corresponds to the second phase of the pixel connection; that is, when capacitor C1 has been pulled up by the pixel voltage being connected to the reference level, and the input to the buffer amplifier T7 is presented with the pixel voltage. As this terminal is the input to the buffer amplifier T7, its output is approximately at the pixel voltage, only differing by its offset voltage. Therefore in this second phase, capacitor C2 is charged to a voltage which stores the pixel voltage and the offset voltages of both the buffer amplifier T7 and the comparator T9. In the next phase, denoted as Phase 3 in FIG. 3, switch transistor T10 turns off, and a ramp voltage is applied to terminal 4 through the reference-setting transistor T5, which is now again turned on. When the initial ramp voltage is connected to the input of buffer amplifier T7, its input voltage drops, as does its output voltage and thus also, through capacitor C2, does the input to the comparator T9. As the ramp voltage 4 is now increased, it can be seen that the comparator T9 will achieve its switching threshold when the input ramp voltage is at a value which equals the voltage that was presented to the input of the buffer amplifier T7 by the pixel voltage. Therefore, offsets and low frequency noise have been canceled.

The output of the comparator T9 acts to store the counter value when it switches. This, as described above, occurs at the time that the ramp voltage is equal to the pixel voltage value. A digital output value is thereby obtained which corresponds to the pixel voltage level. An analog-to-digital conversion has therefore been accomplished. Moreover, this conversion is performed on all columns at once (or in "parallel"), so that the resulting digital counter output value can be transferred out of the chip by shifting it out, column by column, in a serial fashion. Because the data is in digital form, this shifting operation can be performed at high speed.

In contrast, if the data is shifted out in analog form for subsequent conversion to a digital value, a number of significant problems ensue. It is difficult to shift out the data in analog form because of the rather large capacitance that must be driven by the column switches. In addition, the analog-to-digital conversion must now be done sequentially, as the analog data from each column is sent out to it; thus, a very high speed conversion-rate ADC is required. In contrast, the conversion time of the present technique may be hundreds of times longer for the same effective speed.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A self-compensating correlated double sampling (CDS) circuit for an image sensor comprising:

correlating double sampling means for extracting a pixel image signal, comprising: a first capacitor, a buffer amplifier, and a reference-setting transistor, said CDS means having an input terminal in response to said pixel image signal when said reference-setting transistor being on and said CDS means outputting a corresponding signal from an output of buffer amplifier when said reference-setting transistor being switched from on to off, said first capacitor having a plate serving as said input terminal and the other plate connected to an input terminal of said buffer amplifier, said reference-setting transistor connecting between a node and a ramp voltage supply, further said node being between said first capacitor and said buffer amplifier.

2. The sampling circuit according to claim 1, further comprises a current source transistor which has a drain terminal being connected to said input terminal of said CDS means and has a source terminal being connected to a ground.

3. The sampling circuit according to claim 1, further comprises a pixel image generator means for providing an input signal, said pixel image generator means comprising:

photosensor for receiving a light signal;

a reset transistor being connected between said photosensor and a voltage reference;

a row transistor having a gate in response to an access signal to select said photosensor; and a source follower transistor being connected to said input terminal of said CDS means through said row transistor, and with a gate thereof being connected to a node between said photosensor and said reset transistor.

4. A signal processor circuit for a pixel image signal with a self-compensating correlated double sampling (CDS) and an analog-to-digital comprising:

a first capacitor;

a buffer amplifier;

a reference-setting transistor, said first capacitor having a first plate, serving as an input terminal which is in response to said pixel image signal when reference-setting transistor is on, and with a second plate being connected to an input terminal of said buffer amplifier, said reference-setting transistor connecting between a node and a ramp voltage supply, held at a constant reference voltage; further, said node being between said first capacitor and said buffer amplifier;

a second capacitor having a first plate coupled to an output terminal of said buffer amplifier; and a comparator having a switch transistor being connected between an input terminal and an output terminal of said comparator, said input terminal of said comparator being coupled to a second plate of said second capacitor, further, said comparator setting a switching threshold voltage, which is a value received from said pixel image signal when said switch transistor is on and said reference-setting transistor being switched from on to off, still further, said comparator setting an output signal to a digital counter when said switch transistor is off and said reference-setting transistor being switched from off to on so as to receive an increasing ramp voltage.

5. The signal processor circuit according to claim 4, further comprises a current source transistor which has a drain terminal being connected to said input terminal of said CDS means and has a source terminal being connected to a ground.

6. The signal processor circuit according to claim 4, further comprises a pixel image generator means for providing an input signal, said pixel image generator means comprising:

a photosensor for receiving a light signal;

a reset transistor being connected between said photosensor and a voltage reference;

a row transistor having a gate in response to an access signal to select said photosensor; and a source follower transistor being connected to said input terminal of said signal processor circuit through said row transistor, and with a gate thereof being connected to a node between said photosensor and said reset transistor.

* * * * *